P. DIEHL.
GEAR MOUNTING.
APPLICATION FILED OCT. 31, 1912.
1,171,327.
Patented Feb. 8, 1916.
2 SHEETS—SHEET 2.
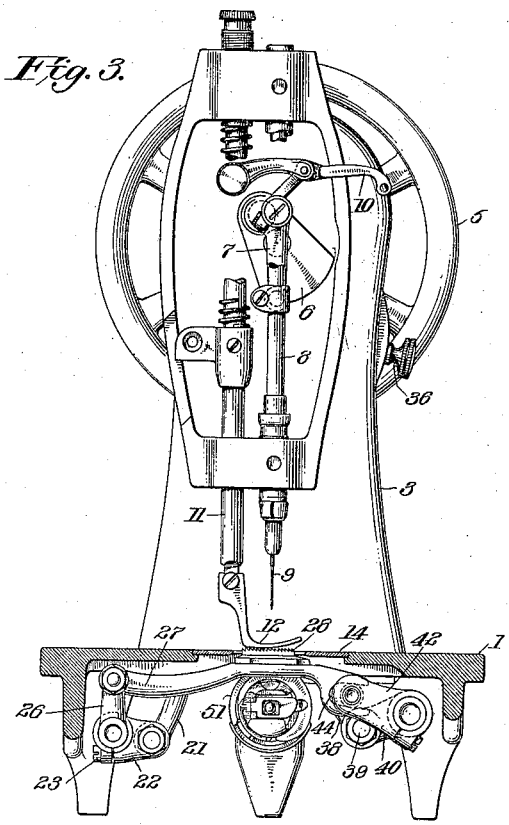
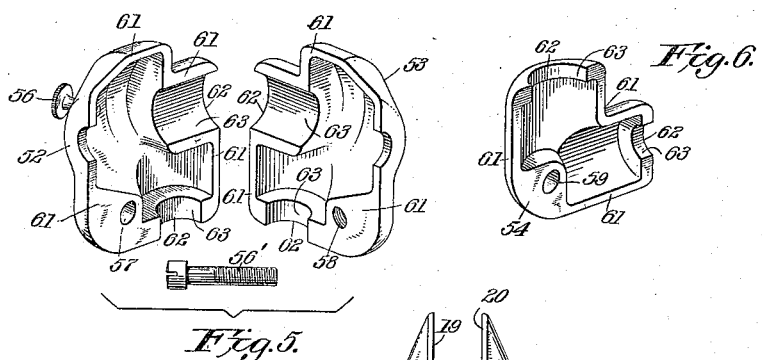
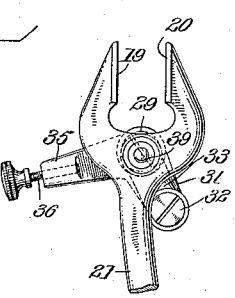
WITNESSES:
INVENTOR
Philip Diehl.
BY
ATTORNEY

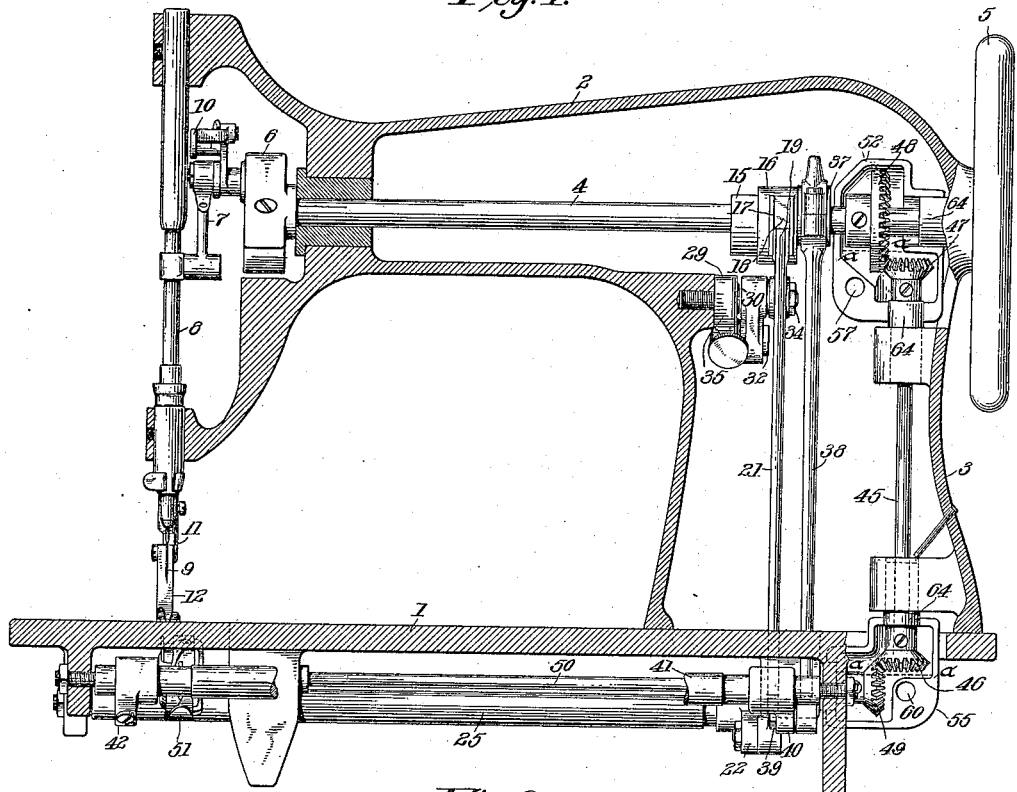

UNITED STATES PATENT OFFICE.

PHILIP DIEHL, OF ELIZABETH, NEW JERSEY, ASSIGNOR TO THE SINGER MANUFACTURING COMPANY, A CORPORATION OF NEW JERSEY.

GEAR-MOUNTING.

1,171,327. Specification of Letters Patent. Patented Feb. 8, 1916.

Application filed October 31, 1912. Serial No. 728,779.

*To all whom it may concern:*

Be it known that I, PHILIP DIEHL, a citizen of the United States, residing at Elizabeth, in the county of Union and State of New Jersey, have invented certain new and useful Improvements in Gear-Mountings, of which the following is a specification, reference being had therein to the accompanying drawings.

This invention relates to improvements in sewing machines, and has for its object to provide improved means for giving to the loop-taker its rotary movements.

As is well understood by those familiar with sewing machine construction, the features important to the development of high speed lock stitch sewing machines are the employment of a loop-taker having a plurality of rotations to one complete actuation of the needle-carrying bar, and a flexible connection, such as a belt, for transmitting power from the main or needle-bar-driving shaft to the loop-taker.

It is conceded that for durability the employment of a belt connection is undesirable, and prior to the present invention gears of various forms and arrangement have been substituted, but owing to their exposed condition and manner of application and the undersirable noise common to co-acting gears driven at high speed—especially when subjected to sudden stopping and starting as in the operation of sewing machines driven by mechanical power—they have proven less desirable than a belt.

In the present construction, the loop-taker-driving shaft is relieved of all transmission of power except to rotate the loop-taker, and, accordingly, the connection for operatively connecting the main shaft with the loop-taker-driving shaft performs a minimum of labor, and the gears are arranged and protected to avoid any perceptible noise due to their coaction; further, the means employed for effecting the lubrication of the gears and the shaft bearings are so devised as to insure that no foreign substance will enter the lubricant, and that the teeth of the several gears will at all times be cushioned against direct contact, thus avoiding the liability of their becoming defective through the sudden stopping, starting or reversing of the actuating mechanism.

In the accompanying drawings illustrating the invention, in the several figures of which like parts are similarly designated, Figure 1 is a view in front side elevation of a sewing machine embodying the improved mechanism, the bracket arm and bed-plate being shown in section and the feed-lift rock-shaft broken out to better illustrate the relative action of the parts. Fig. 2 is an underside view of the machine shown in Fig. 1, except that the lower oil receptacle is shown in section. Fig. 3 is a front end elevation of the machine shown in the previous figures, except that the bed-plate is shown in cross section on a line corresponding substantially to the line of needle actuation. Fig. 4 is a detail view of the feed-adjusting mechanism. Fig. 5 is a view of the oppositely arranged halves of the oil receptacle or retainer inclosing the gears connecting the main or needle-bar-actuating shaft with the vertically arranged gear shaft, through which latter motion is transmitted to the looper-actuating shaft. Fig. 6 is a detail view of one of the halves of the oil receptacle inclosing the gears connecting the vertically arranged gear shaft with the looper-actuating shaft.

Referring to the figures, 1 represents the bed-plate of the sewing machine upon which is mounted the bracket arm comprising the tubular arm bracket 2 and hollow standard 3, 4 the main or needle-bar-actuating shaft carrying at one end the band or hand wheel 5 and at its opposite end the shaft flange 6 connected by a link 7 with the needle-bar 8 carrying the eye-pointed needle 9, and 10 one form of commonly employed take-up.

11 represents the spring-depressed cloth-presser-carrying bar, 12 the cloth-presser, 13 the front slide plate and 14 the throat or needle plate.

Upon the main shaft 4 is suitably secured a feed-eccentric 15 provided with an eccentric ring 16, the latter having oppositely arranged straight surfaces, as 17, each of which is provided with a groove, as 18, (one only of said straight sides being shown) and into said grooves are mounted the respective shoes 19 and 20 of the forked feed-eccentric connection 21 whose lower end is pivotally attached to an arm 22 secured by pinch screw 23 and pin 24 to the feed rock-shaft 25, the forward end of the latter being provided with a crank arm 26 pivotally connected to one end of a feed-dog-carrying bar 27 provided with a feed-dog 28, thus transmitting from the feed-eccentric 15 feed movements to said feed-dog.

29 represents a bell crank feed-adjusting lever pivoted by stud screw 30 to the bracket arm, and to the arm 31 of said lever is pivotally connected, by screw 32, one end of a link 33 whose opposite end is pivotally attached, by screw 34, to the feed-eccentric connection 21, the arm 35 of said lever being provided with a screw 36 the head of which is located outside of the bracket arm and employed to shift said bell crank lever on the stud screw 30 to position the link 33 at an angle to the vertically arranged movements of the connection 21, to effect the desired amplitude of feed movement as in earlier constructions.

37 represents the feed-lift eccentric carried by the main shaft and encircled by the upper end of the feed-lift eccentric connection 38 whose lower end is pivotally connected, by screw 39, to an arm 40 carried by the feed-lift rock-shaft 41, the forward end of the rock-shaft carrying a crank arm 42 provided with a slide block 43 which enters a forked opening 44 in the end of the feed-dog-carrying bar 27, thus transmitting vertically arranged movements from the eccentric 37 to the feed-dog 28.

45 represents a vertically arranged gear shaft which carries at its lower end a bevel gear 46 and at its opposite end a like gear 47, the latter meshing with a bevel gear 48 carried by the main shaft 4, and as said gear 48 and gear 47 are of the ratio of two to one, the gear shaft 45 is given two rotations to one rotation of said main shaft, the gear 46 meshing with a like gear 49 carried by the looper-actuating shaft 50 provided with a loop-taker 51.

Important to the present construction is the providing of substantially oil-tight receptacles or retainers inclosing the upper and lower coacting gears for connecting the main shaft and looper-actuating shaft with the gear shaft.

Referring to Figs. 1 and 5, 52 and 53 represent the two halves of the upper oil receptacle, and in Figs. 1 and 6, 54 and 55 represent the two halves of the lower oil receptacle, in each instance the two halves being identical except that the half 52 is provided with a suitable opening (not shown) into which is threaded a screw 56, said opening comprising convenient means for replenishing the lubricant. The separate halves of the upper receptacle are secured together by a screw 56' passing through the opening 57 and threaded into the opening 58, the separate halves of the lower receptacle being secured together in like manner by a screw passing through the opening 59 and threaded into the opening 60.

The surfaces, as 61, of the oil receptacles are milled or faced to insure that the joint formed by securing together the two halves will be substantially leakage proof, and to prevent the leakage of lubricant through the circular openings 62 formed by the union of the separate halves and to firmly lock the receptacles against accidental movement; the walls 63 are forced by screws 56' into contact with the peripheral or securing surfaces of the stationary members 64, comprising in the present instance bushings into which are mounted to rotate the opposite ends of the shaft 45 and the rear ends of the shafts 4 and 50. In each instance the dividing lines of the receptacles substantially intersect the axes of the inclosed gears.

In practice, the receptacles are supplied with a semi-fluid lubricant, as grease or vaseline, in sufficient quantity to insure that the gear teeth of one of the co-acting gear members will effect a distribution of the lubricant over the gear teeth of its coacting gear member, substantially as shown by dotted lines $a-a$, Fig. 1, which in effect cushions the gear teeth, thus preventing the undesirable noise incident to the employment of gears operated at comparatively high speed and tending to lessen the liability of the gear members being damaged through the sudden stopping and starting of the machine, and as the gear teeth are protected from coming in contact with substances likely to interfere with their action, the earlier objections incident to the use of gear connections for transmitting power from the needle-bar-actuating to the looper-actuating shaft are obviated to an extent that gives to the present construction substantial advantages over those employing belt connections for a like transmission of power.

Claim:—

In a sewing machine, a frame constructed with a bed-plate and a bracket-arm formed with a hollow standard and a tubular arm extending therefrom and overhanging said bed-plate, transversely arranged bearing bossed members carried by and fixedly secured to said frame and provided with inner shaft bearings and outer securing surfaces, shafts journaled in said bearing bossed members, gear members operatively connecting said shafts, gear casings in which said gear members are inclosed, said gear casings comprising separate halves provided with transversely arranged walls fixedly secured only upon said outer securing surfaces to effect substantially air tight receptacles.

In testimony whereof, I have signed my name to this specification, in the presence of two subscribing witnesses.

PHILIP DIEHL.

Witnesses:
F. W. OSBORN,
HENRY A. KORNEMANN, Jr.

Copies of this patent may be obtained for five cents each, by addressing the "Commissioner of Patents, Washington, D. C."